(12) United States Patent
Haimer et al.

(10) Patent No.: US 10,129,933 B2
(45) Date of Patent: Nov. 13, 2018

(54) INDUCTION COIL UNIT

(75) Inventors: Franz Haimer, Hollenbach (DE); Josef Hodek, Hollenbach-Igenhausen (DE); Antonin Podhrazky, Hollenbach-Igenhausen (DE)

(73) Assignee: HAIMER GMBH, Hollenbach-Igenhausen (DE)

( * ) Notice: Subject to any disclaimer, the term of this patent is extended or adjusted under 35 U.S.C. 154(b) by 3430 days.

(21) Appl. No.: 11/883,905

(22) PCT Filed: Feb. 8, 2006

(86) PCT No.: PCT/EP2006/001104
§ 371 (c)(1),
(2), (4) Date: Dec. 21, 2015

(87) PCT Pub. No.: WO2006/084678
PCT Pub. Date: Aug. 17, 2006

(65) Prior Publication Data
US 2016/0113069 A1    Apr. 21, 2016

(30) Foreign Application Priority Data

Feb. 9, 2005 (DE) .......................... 10 2005 005 892

(51) Int. Cl.
*H05B 6/10* (2006.01)
*H05B 6/02* (2006.01)
(Continued)

(52) U.S. Cl.
CPC .......... *H05B 6/102* (2013.01); *B23B 31/1179* (2013.01); *B23P 11/027* (2013.01);
(Continued)

(58) Field of Classification Search
CPC ...... B23B 31/1179; B23P 11/027; H05B 6/14; H05B 6/04; H05B 6/102; H05B 6/44
(Continued)

(56) References Cited

U.S. PATENT DOCUMENTS 2,288,039 A * 6/1942 Somes ................... H05B 6/102
                                                   219/644
2,942,089 A * 6/1960 Baker ...................... H05B 6/02
                                                   219/652
(Continued)

FOREIGN PATENT DOCUMENTS

DE          922700        1/1955
DE          1094893 B    12/1960
(Continued)

OTHER PUBLICATIONS

International Preliminary Report on Patentability and an English translation of the Written Opinion dated Oct. 9, 2007, issued on corresponding PCT International Application No. PCT/EP2006/001104.
(Continued)

*Primary Examiner* — Quang Van
(74) *Attorney, Agent, or Firm* — Kilpatrick Townsend & Stockton LLP

(57) ABSTRACT

According to the invention, for shrinking and expanding a tool in the bush part (3) of a tool holder, an induction coil unit (1), in which several polar parts (25) made of a soft magnetic material are radially adjusted in the yoke ring made of a soft magnetic material, is provided. Said polar parts have end faces (29) which are inclined in relation to the axis of rotation (7) of the bush part (3) and can be kept in a linear contact with a conical peripheral surface (31) of the bush part (3) which holds a the tool (11) in a press fit manner. In order to avoid possible local overheating of the bush part (3), the area (39) of the end face (29) parallel to the axis is connected on the output side of the tool to an area (33) of the end face (29) inclined in relation to the axis of rotation (7).

49 Claims, 7 Drawing Sheets

(51) Int. Cl.
*B23B 31/117* (2006.01)
*B23P 11/02* (2006.01)
*H05B 6/14* (2006.01)
*H05B 6/04* (2006.01)
*H05B 6/44* (2006.01)

(52) U.S. Cl.
CPC .................. *H05B 6/04* (2013.01); *H05B 6/14* (2013.01); *H05B 6/44* (2013.01)

(58) Field of Classification Search
USPC ....... 219/618, 619, 635, 652, 644, 674, 643, 219/607, 676; 242/434.7; 266/125, 127, 266/129
See application file for complete search history.

(56) References Cited

U.S. PATENT DOCUMENTS

| | | |
|---|---|---|
| 4,745,251 A | 5/1988 | Vickers et al. |
| 4,761,527 A | 8/1988 | Mohr |
| 6,712,367 B1 | 3/2004 | Irion et al. |
| 6,867,396 B2 | 3/2005 | Haimer et al. |
| 6,900,418 B2 | 5/2005 | Haimer et al. |
| 6,991,411 B2 | 1/2006 | Irion et al. |
| 2003/0168445 A1 | 9/2003 | Haimer |
| 2004/0160020 A1 | 8/2004 | Irion et al. |
| 2008/0277386 A1 | 11/2008 | Haimer et al. |
| 2010/0200571 A1 | 8/2010 | Haimer et al. |
| 2011/0284525 A1 | 11/2011 | Haimer et al. |
| 2014/0361008 A1 | 12/2014 | Haimer et al. |

FOREIGN PATENT DOCUMENTS

| | | | |
|---|---|---|---|
| DE | 19915412 | 10/2000 | |
| DE | 10046547 A1 | 3/2002 | |
| DE | 10157432 | 6/2003 | |
| DE | 20203784 | 7/2003 | |
| DE | 102005005892 | 8/2006 | |
| DE | 102005014984 | 10/2006 | |
| DE | 102008045781 | 3/2010 | |
| FR | 1524221 A | 5/1968 | |
| JP | 2010244998 A * | 10/2010 | ............ H05B 6/062 |
| WO | WO-0189758 A1 | 11/2001 | |
| WO | 2006084678 | 8/2006 | |
| WO | 2008098752 | 8/2008 | |

OTHER PUBLICATIONS

German Patent Office communication dated Jun. 30, 2015 issued during the prosecution of German Patent Application No. DE 10 2005 005 892.2.
U.S. Appl. No. 14/344,735, "Final Office Action", dated Apr. 21, 2017, 20 pages.
U.S. Appl. No. 14/344,735, "Non-Final Office Action", dated Jul. 13, 2016, 14 pages.
U.S. Appl. No. 14/344,735, "Restriction Requirement", dated Apr. 5, 2016, 7 pages.
German Application No. 102011082613.0, "Search Report", dated Apr. 25, 2012.
International Application No. PCT/EP2006/001104, "International Written Opinion", dated Aug. 9, 2007, 10 pages.
International Application No. PCT/EP2012/067720, "International Preliminary Report on Patentability", dated Mar. 18, 2014.
International Application No. PCT/EP2012/067720, "International Search Report", dated Jan. 3, 2013.

* cited by examiner

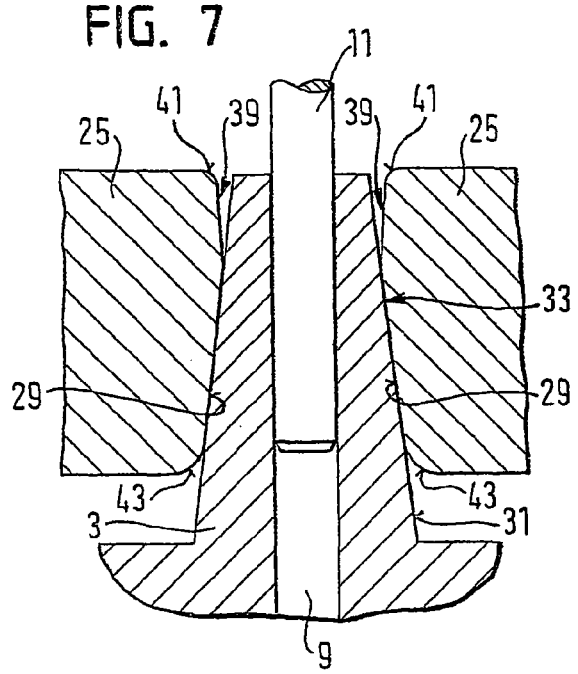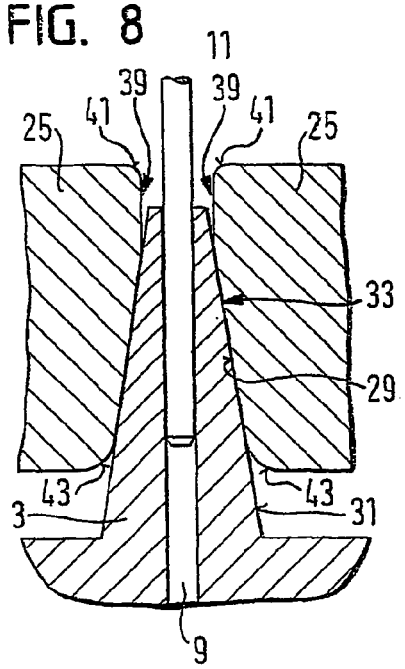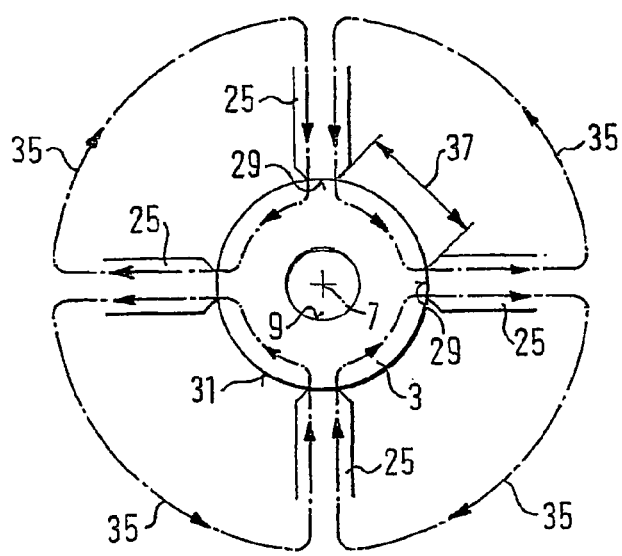

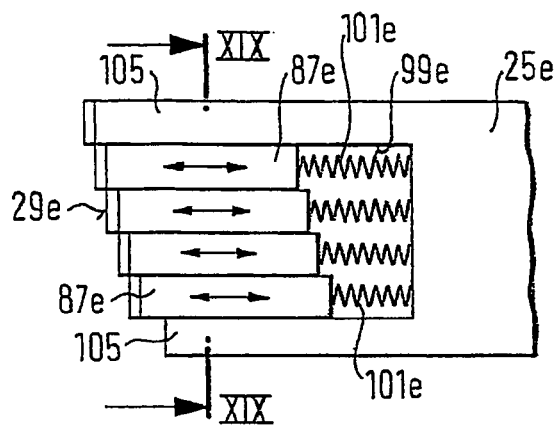
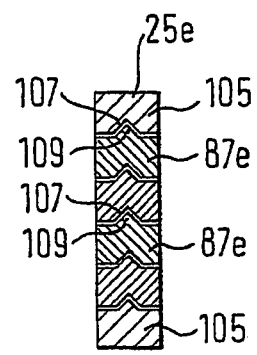
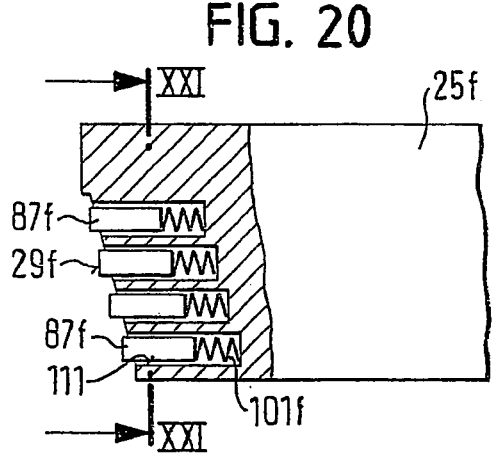
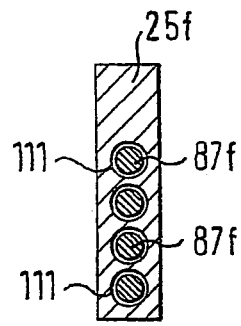
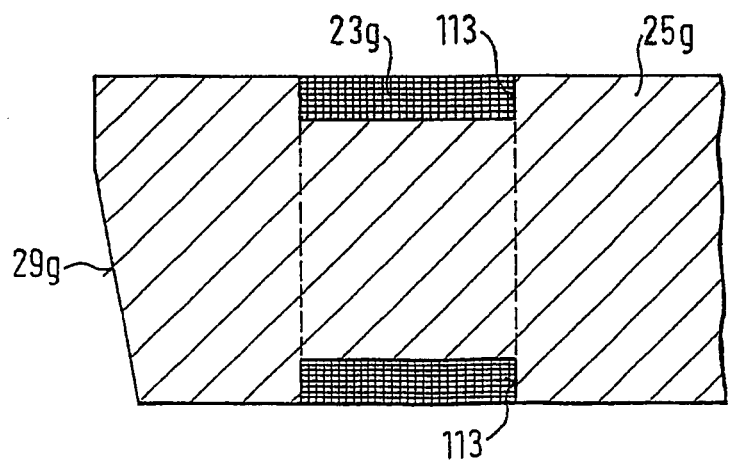

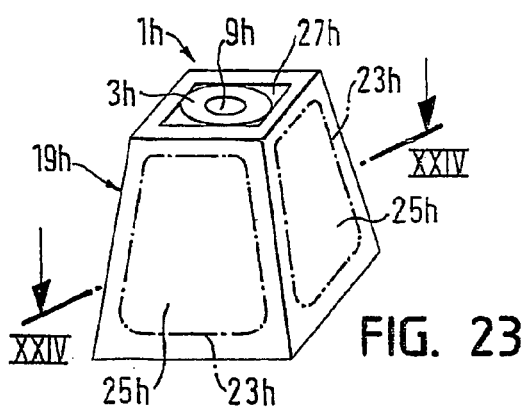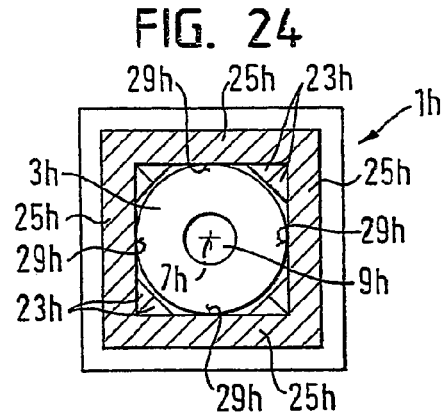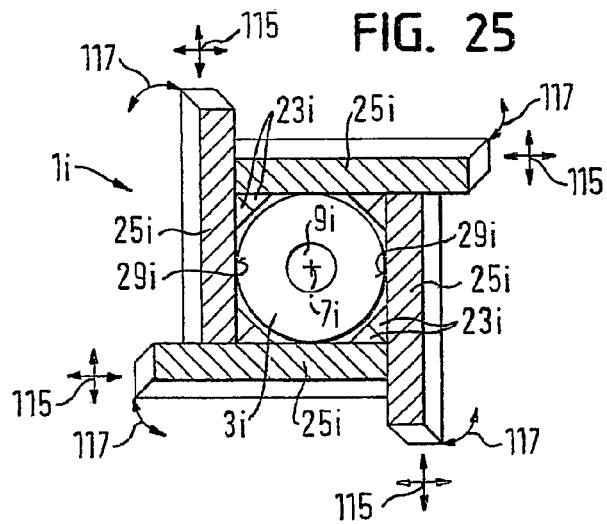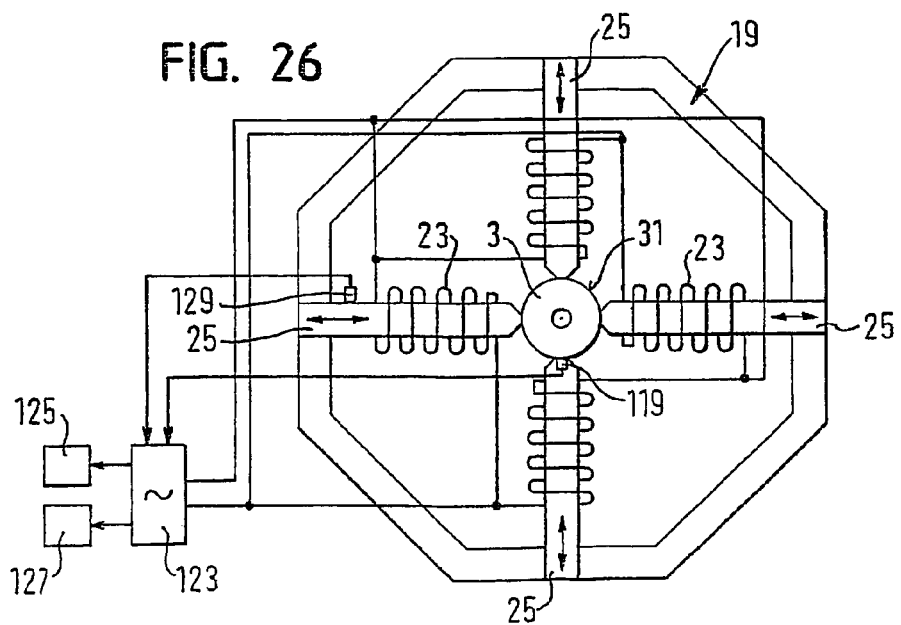

INDUCTION COIL UNIT

CROSS REFERENCE TO RELATED APPLICATIONS

The subject application is a national stage filing of International Application No. PCT/EP2006/001104, filed Feb. 8, 2006, which claims priority to German Patent Application No. 10 2005 005 892.2, filed Feb. 9, 2005. The disclosure of each is expressly incorporated herein by reference thereto.

The invention relates to an induction coil unit for heating a component which is rotationally symmetrical relative to an axis and is composed of electrically conductive material, in particular a sleeve part, which holds an elongated object with an interference fit in a retaining opening which is central with respect to the axis, preferably for heating the sleeve part of a tool holder which holds a shank of a rotating tool, in particular a drilling and milling tool, with an interference fit in its retaining opening which is central with respect to the rotation axis.

It is generally known for components, in particular components which are rotationally symmetrical relative to an axis, to be heated by means of inductively produced eddy currents, for example for annealing or tempering, or else for surface hardening. It is likewise known for the shrinkage structure of a sleeve part which surrounds a shaft or a shank with an interference fit, for example, of a bearing ring or the like, to be inductively heated and thus to be widened sufficiently to allow the sleeve part to be released from the shaft.

It is also known for the cylindrical shank of a tool which can be driven to rotate, for example of a drill or a milling cutter, to be shrunk into an essentially cylindrical retaining opening in a tool holder. The tool holder may be an integral component of a machine spindle or else itself may have a coupling section, for example, in the form of a conical end section, by means of which it is attached to the drive spindle. The tool shank is oversized with respect to the internal diameter of the retaining opening. In order to insert or remove the tool shank, a sleeve part, containing the retaining opening, of the tool holder is heated until the internal diameter of the retaining opening has expanded sufficiently that the tool shank can be inserted or removed. After cooling down, the sleeve part holds the tool shank with an interference fit.

WO 02/24965 A1 discloses an induction coil unit for heating the sleeve part of a tool holder, which holds the tool in a retaining opening, which is central with respect to the rotation axis of the tool, with an interference fit, and in which two coil cores, which are each fitted with one coil and whose pole surfaces run at a distance from one another, are arranged on radially opposite sides of the sleeve part, so that the sleeve part of the tool holder can be inserted into the air gap between the mutually facing pole surfaces. The width of the air gap can be changed by moving the cores, and can be matched to sleeve parts with different diameters. In the case of the known induction coil unit, the coils associated with the cores are firmly connected to them, and the known induction coil unit induces currents which run in the circumferential direction in the sleeve part.

A further induction coil unit for heating the sleeve section of a tool holder is known from US 2003/0168445 A1. In this induction coil unit, the pole pieces which are surrounded by the coils and are distributed in the circumferential direction of the sleeve part are arranged on two segments, which are connected to one another such that they can be folded, of an annular yoke, such that the sleeve part can be inserted radially into the retaining area of the induction coil unit when the yoke is open. This also allows tools to be shrunk whose head diameter is larger than the distance between the pole surfaces of the cores.

Finally German examined Patent application 1 094 893 and German patent 922 700 disclose induction coil units whose cores can be moved radially relative to the coils, which are arranged to be stationary. The induction coil units allow the release of bearing rings, which have been shrunk onto a shaft, of a roller bearing, in which case, in this case as well, the magnetic flux produced by the coils produces induced currents, which run in the circumferential direction, in the sleeve part to be heated.

It has been found that conventional induction coil units of the type explained above can often be used to heat a rotationally symmetrical component only inadequately uniformly in the axial direction and/or in the circumferential direction. This is particularly disadvantageous when the aim is to heat a sleeve part of a shrinkage structure and in particular the sleeve part of a tool holder for shrinking rotating tools into and out of the tool holder. The inadequately uniform heating leads to non-uniform thermal expansion of the sleeve part, and in specific cases can lead to local overheating damage to the sleeve part.

The object of a first aspect of the invention is to provide an induction coil unit for heating a rotationally symmetrically component, in particular a sleeve part, for example of a tool holder, which allows the sleeve part to be heated more uniformly than in the past.

The invention is based on an induction coil unit for heating a component which is rotationally symmetrical relative to an axis and is composed of electrically conductive material, in particular a sleeve part, which holds an elongated object with an interference fit in a retaining opening which is central with respect to the axis, preferably for heating the sleeve part of a tool holder which holds a shank of a rotating tool, in particular a drilling or milling tool, with an interference fit in its retaining opening which is central with respect to the rotation axis, with this induction coil unit comprising:

- a retaining area which is central with respect to the axis for the component,
- a number, in particular an even number, of pole pieces which are arranged distributed at equal angular intervals around the axis and are composed of a material with soft-magnetic characteristics, guiding magnetic flux,
- a plurality of coils which can be fed with alternating current, to produce magnetic fluxes in the pole pieces such that the magnetic flux is in the opposite direction in the circumferential direction of adjacent pole pieces.

According to the invention, the object mentioned above is achieved in that the pole pieces have end surfaces which radially face the axis and can be brought into touching contact, in the form of a line or an area, or virtually such a touching contact, with the outer circumferential surface of the component over the majority of their axial height in a first area along the generatrix of an outer circumferential surface of the component, and in that a second area is adjacent to the first area axially on at least one side of the first area, at least one of the end surfaces, in particular each of the end surfaces, in which second area the end surface runs at a greater radial distance from the generatrix of the outer circumferential surface than in the first area.

The generatrix of the outer circumferential surface is the contour boundary line, in the mathematical sense. When the expressions radial direction, axial direction or circumferential direct ion are used here and in the following text, then they always refer to the direction to said rotation axis.

It has been found that field concentrations occur at the axial end areas of the pole pieces, and themselves lead to non-uniform heating of the component close to the end areas of the pole piece. The increase in the radial distance between the end surface of the pole piece and the circumferential surface of the component in the area of these axial end areas ensures more uniform heating. Since the pole pieces extend to a point very close to the outer circumferential surface of the component, and preferably rest on this circumferential surface, stray magnetic fields in the area of the component are largely avoided, and this is particularly advantageous when releasing a shrinkage structure, for example a tool holder.

In the second area, the distance between the end surface and the generatrix of the circumferential surface of the component can be increased suddenly. However, in order to achieve more uniform heating, it is advantageous for the end surface to run at an angle to the generatrix of the circumferential surface in the second area with the radial distance from the generatrix increasing as the axial distance from the first area increases.

The generatrix may define a conical circumference surface of the component, as is normally the case, for example, with conventional tool holders with conical sleeve parts which taper towards the tool outlet side. Since the magnetic reluctance varies axially owing to the coning angle of the component, the component may be heated very differently in the axial direction, because of its shape. This can be counteracted if the second area of the end surfaces is adjacent to the side of the first area with the smaller diameter, that is to say in the case of a tool holder it is on the side facing towards the tool outlet side.

The flux concentration in the component close to the axial ends of the end surfaces of the pole pieces can furthermore be counteracted if that end surface of each pole piece which radially faces the axis has an edge surface which runs away from the axis, in particular a rounded edge surface, at one of its axial ends or at both of its axial ends. The radial distance from the outer circumferential surface of the component, which becomes larger because of the rounded edge surface, for example, reduces the magnetic flux density in this area, and prevents local overheating of the component, for example of the sleeve part of a tool holder.

The aspect of the invention explained above makes it possible to ensure more uniform heating of the component in the axial direction. However, it has been found that conventional induction coil units frequently also result in non-uniform heating of the component in the circumferential direction. In order to ensure more uniform heating in the circumferential direction, a second aspect of the invention provides for the pole pieces to be in the form of flat disks, whose flat faces run essentially parallel to the axis, and whose end surfaces which radially face the axis can be brought into touching contact, in the form of a line or an area, or virtually into such a touching contact, with the outer circumferential surface of the component over the majority of their axial height.

In this refinement which also has inventive significance independent of the first aspect, the touching contact of the pole pieces is restricted to a narrow area with respect to the overall circumferential length in the circumferential direction, in order to ensure that a sufficiently high proportion of the magnetic flux runs in the circumferential direction in the component, since this has been found to be advantageous for uniform heating. In particular, this aim can be achieved if that end surface of each pole piece which faces the axis tapers towards the axis, at least in its touching contact area. Seen on a plane at right angles to the axis, the distance between the end surface and the circumferential, surface of the component which increases radially in this way ensures that the magnetic flux enters the component essentially in the area of the narrow touching contact surface. Furthermore, the tapering of the end surfaces increases the circumferential distance between adjacent pole pieces, and this reduces stray fluxes between the pole pieces, particularly when the pole pieces for sleeve parts with a small diameter are moving radially towards one another. The end surfaces may be rounded in a convex shape in the touching contact area, for example by being rounded in a partially circular cylindrical form; however, they may also taper in a wedge shape in the touching contact area.

In order to reduce the stray flux and magnetic losses associated with it, one preferred refinement provides for the pole pieces to have the capability to be moved radially relative to a yoke ring, which surrounds the retaining area concentrically with respect to the axis and is composed of soft-magnetic material which is permeable to magnetic flux, and for the coils to be arranged radially within the yoke ring.

Although a plurality of pole pieces can each have an associated common coil, it is, however, preferable for each pole piece to have a separate associated coil, which surrounds its pole piece. This refinement makes it easier to make the magnetic flux that is induced in the component magnetically symmetrical.

The production effort and the production costs can be reduced by the yoke ring being composed of segments. This is particularly advantageous when each segment is combined with one of the coils and one of the pole pieces to form a unit. It is self-evident that one of the segments can in each case also be combined with in each case one of the pole pieces to form a T-shaped unit, which can be moved radially as an entity.

In this case, the pole pieces can pass through openings in the yoke ring and/or in the segments, such that they can move, to be precise preferably in such a way that the yoke ring covers those axial end surfaces of the coils which face it on all sides. This makes it possible to reduce the stray magnetic flux particularly well. For this purpose, each coil can also engage in a pocket, which is radially recessed in the yoke ring, at least over a part of its axial coil height.

For safety reasons, the yoke ring and the coils are expediently fixed in an annular housing composed of electrically insulating material. The housing may be a prefabricated sleeve part into which the yoke ring and the coils are inserted. However, the housing preferably has a ring, which is cast on the yoke ring and the coils, surrounds at least the coils, and is composed of plastic potting compound, which ensures positioning and isolation of the coils, and if appropriate of the yoke ring. A design such as this is mechanically robust and can be produced at low cost even if additional holders or housing parts have to be fitted for attaching the induction coil unit to a guide, which is fixed to the shrinking appliance or the like. If required, these housing parts can also be used as a "lost casting mold" for the potting compound ring.

The retaining area for the induction coil unit, which is intended to hold the component, for example the sleeve part of the tool holder, may have a relatively large diameter, since the pole pieces can be moved radially for matching during operation to the actual diameter of the component. The yoke ring is therefore expediently fitted on one of its end faces or both of its end faces, for example on its end face that is axially adjacent to the tool outlet side of the sleeve part, with an annular disk which is provided with an aperture opening for the tool and is composed of soft-magnetic material, which is permeable to magnetic flux, at an axial distance from the pole pieces. The annular disk magnetically shields the area around the induction coil unit.

The induction coil unit preferably has four or more pole pieces which can be moved radially. In order to simplify control it should therefore be possible to positively move all of the pole pieces jointly. On the other hand, it should be possible to radially split the housing which carries the pole pieces and coils such that they can move, in order to allow tools to be shrunk in a manner known per se into the tool holder even if the head diameter of the tools is larger than the diameter of the retaining area, so that the tool cannot be introduced axially into the retaining area.

In one preferred refinement, which according to a third aspect of the invention can also be used for induction coil units other than those that have already been explained, that is to say they have inventive significance in their own right, provision is made for the pole pieces to be guided, such that they can be moved radially, relative to a housing which surrounds the retaining area in an annular shape, and to be coupled to an actuating ring, which is guided coaxially with respect to the axis such that it can rotate on an annular guide, which surrounds the retaining area, of the housing, such that, when the actuating ring carries out a rotary movement, the pole pieces jointly carry out a radial displacement movement. The housing including the actuating ring which is guided on it such that it can rotate coaxially is in this case subdivided into two assemblies, in particular halves, which can be moved relative to one another, radially with respect to the axis, for radial opening of the retaining area, with a coupling apparatus detachably connecting the assemblies for operational purposes. As long as the two housing halves are connected to form a closed ring, the actuating-ring halves can also be rotated corresponding to a closed ring, since each of the two actuating-ring halves is guided on one of the housing halves such that it can rotate in its own right.

For radial opening of the retaining area, one of the two assemblies can be removed as an entity from the other assembly, or can be moved along a linear guide. However, in one physically simple and nevertheless robust embodiment, the two assemblies are connected to one another by means of a hinge such that they can be folded. The coupling apparatus which is provided for connection of the two assemblies is expediently designed such that it alternately either connects the two housing segments to one another or fixes the actuating-ring segment, which is guided on the housing segment such that it can rotate, on the housing segment such that it cannot rotate.

Depending on the component, for example the tool holder type, the conical component may have different coning angles. It should accordingly be possible to match the inclination angle of the end surface of the pole pieces to different coning angles. A first variant provides for the pole pieces to be held replaceably on the induction coil unit for matching purposes, so that pole pieces that are matched to the coning angle can in each case be used. In embodiments with an actuating ring of the type explained above, which moves all of the pole pieces jointly, it is possible to provide for the actuating ring to have spiral guides which interact with coupling members of the pole pieces and convert the rotary movement of the actuating ring to a joint radial pushing movement of the pole pieces, with the spiral guides opening on the circumference of the actuating ring, in particular its external circumference, and with the pole pieces being guided in the housing such that they can be removed radially. It is self-evident that the spiral guides can also open on the inner circumference of the actuating ring, in which case the pole pieces are then removed inwards.

Alternatively, however, it is also possible to provide for those end surfaces of the pole pieces which can be brought into touching contact with the outer circumferential surface of the component to have a contour which can be varied during operation, so that there is no need to replace the pole pieces as such for matching to different component contours. In a fourth aspect to the invention, this idea can also be used for induction coil units other than those explained above, and therefore has inventive significance in its own right.

In a first refinement, the end surface can be provided on an end piece which is held on the pole piece such that it can pivot about a pivoting axis which runs tangentially with respect to the axis, with this end piece being matched, in an articulated form, to the inclination angle of the outer circumferential surface of the component. Alternatively, however, the end surface can also be provided on an end piece which is held on the pole piece such that it can be replaced for operational purposes. In this case, only the end piece adjacent to the axis is replaced, rather than the entire pole piece.

In another autonomously matching variant, the pole piece may have a plurality of end pieces which can be moved relative to one another radially with respect to the axis and whose end surfaces which radially face the axis jointly form the end surface of the pole piece.

In the embodiments of the induction coil unit that have been explained above, the pole pieces are guided such that they can move radially. In one alternative, which has inventive significance in its own right, a fifth aspect of the invention provides for the capability to arrange the pole pieces such that they can move radially but can also be fixed radially, and for them to essentially form flat wall panels of a yoke ring which is in the form of a truncated pyramid and surrounds the retaining area, in which case the inner wall surfaces, which form the end surface of the pole pieces, of the wall panels can be brought into touching contact, at least approximately in the form of a line, or virtually into such a touching contact, with the outer, conical circumferential surface of the component. In this embodiment, in other words, the yoke ring at the same time forms the pole pieces. In this case as well, the induction coil unit can be matched to components with different diameters and/or with different coning angles, if the wall panels are guided such that they can be moved tangentially and/or radially with respect to the axis, for matching to the diameter of the component, and/or are guided such that they can be inclined relative to the axis, for matching to the coning angle of the component.

It is self-evident that the contour configurations of the end surfaces of the pole pieces as explained above in order to make the heating uniform can be used for all of the variants of the pole pieces that have been explained above.

During operation, the coils of the induction coil unit are excited with alternating current, in particular a high-frequency alternating current at frequencies of several kHz or more. In order to avoid overheating of the component, the duration and/or the current level of the alternating current supplied from a generator is provided with open-loop or closed-loop control. It is also known for the surface temperature of the component to be measured by means of a non-contacting temperature sensor, for example an infrared sensor, and for the generator to be controlled as a function of the measured temperature. However, in the past, temperature measurement methods such as these have been found to be susceptible to faults. The object of a sixth aspect of the invention is therefore to provide a means to allow overheating of the component to be reliably prevented. In the case of an induction coil unit of the type mentioned above, or of any other induction coil unit, this object is achieved in that a temperature sensor which can be brought into direct touching contact with the circumferential surface, is arranged in the end surface, which can be brought into touching contact or virtually into touching contact with the outer circumferential surface of the component, of at least one of the pole pieces.

The coils are connected to a generator which supplies the alternating current. The generator can respond to the temperature sensor and can accordingly switch off the alternating current when the temperature sensor detects or exceeds a predetermined temperature.

Alternatively or else additionally, a signaling or warning arrangement can be provided which responds to the temperature sensor and produces a visual and/or audible warning signal when the temperature sensor detects a temperature which is equal to or greater than the predetermined temperature. It is also possible to provide an indication arrangement, which responds to the temperature sensor and indicates the value of the temperature detected by the temperature sensor, for example such that it can be read on a display.

Since the temperature sensor measures the actual temperature of the component in direct touching contact with it, the temperature can be determined exactly and without interference, and can be used to control the generator.

In order to allow components to be heated reproducibly, it is normal practice to fix the housing of the induction coil unit with the aid of a spacer at a predetermined axial distance from the component during operation. According to a seventh aspect of the invention, with significance in its own right, the induction coil unit is intended for heating a sleeve part, which holds the shank of a rotating tool in the retaining opening centrally with respect to the rotation axis with an interference fit, of a tool holder. The pole pieces are in this case guided such that they can move on a housing which surrounds the retaining area in an annular shape, and a spacer which can be adjusted such that it can move in the axial and/or radial direction is itself guided on the housing. The adjustable spacer makes it possible to use the induction coil unit reproducibly for different types of tool holder. The adjustable spacer simplifies operation particularly when the pole pieces and the spacers are positively coupled to one another, for joint movement, for example via a lever, gear wheel or inclined-surface transmission.

The generator which supplies the alternating current must normally be adjusted for the type and size of the tool holder. According to an eighth aspect of invention, with significance in its own right, the generator can be automatically matched to the component to be heated. For this purpose, the pole pieces and/or a stop element which can move in the axial and/or radial direction, for example the spacer that has been explained above, can be guided on the housing and is intended to make contact with the component to be heated during operation. At least one of the pole pieces and/or the stop element and/or a structural part which is positively coupled to at least one of these components has an associated position sensor which detects the position of the pole piece and/or of the stop element, and/or of the structural part relative to the housing. The generator which supplies alternating current to the coils can respond to the position sensor such that the power and/or the current level of the alternating current and/or the time period for which current is supplied can be controlled as a function of the detected position. A shrinking appliance such as this automatically matches itself to the type of tool holder to be heated.

The coils can be connected in series with one another. However, it is better for all of the coils to be connected in parallel with one another since, in this case, the coil impedance that provides the load for the generator can be kept low and, if required, can be adjusted in its own right. In order to achieve a uniform magnetic flux in the circumferential direction of the component, the coils must have the same characteristics and must be distributed symmetrically around the rotation axis. This can be achieved, inter alia, by all of the coils being wound in the same sense with respect to the radial direction, and having the same number of turns.

In order to reduce the time taken for shrinking, the heated component is normally cooled following the induction heating. For this purpose, the component can be transferred to a separate cooling station. In one expedient refinement, the component is cooled directly in the induction coil unit. For this purpose, at least one nozzle, which is directed at the component, for a coolant, for example cooling water or cooling air, is arranged in the area of the retaining area.

Exemplary embodiments of the invention will be explained in more detail in the following text with reference to drawings, in which:

FIGS. 7 and 8 show axial longitudinal sections through pole pieces of the induction coil unit, in order to explain the method of operation;

FIG. 9 shows an axial cross section through the pole pieces, in order to explain the method of operation;

FIG. 18 shows a side view of a fifth variant of a pole piece which can be used for the induction coil unit shown in FIG. 1;

FIG. 19 shows a section view of the pole piece, seen along the line XIX-XIX in FIG. 18;

FIG. 20 shows a partially cutaway side view of a sixth variant of a pole piece which can be used for the induction coil unit shown in FIG. 1;

FIG. 21 shows a section view through the pole piece, seen along the line XXI-XXI in FIG. 20;

FIG. 22 shows a section view through a unit which comprises a pole piece and a coil and can be used for the induction coil unit shown in FIG. 1;

FIG. 23 shows a perspective, schematic illustration of one variant of an induction coil unit;

FIG. 24 shows an axial cross section through the induction coil unit, seen along the line XXIV-XXIV in FIG. 23;

FIG. 25 shows an axial cross section through one variant of the induction coil unit shown in FIG. 23, and FIG. 26 shows a block diagram in order to explain a temperature-monitored electrical power supply which can be used for the induction coil units shown in FIGS. 1 to 25.

Figure 1:
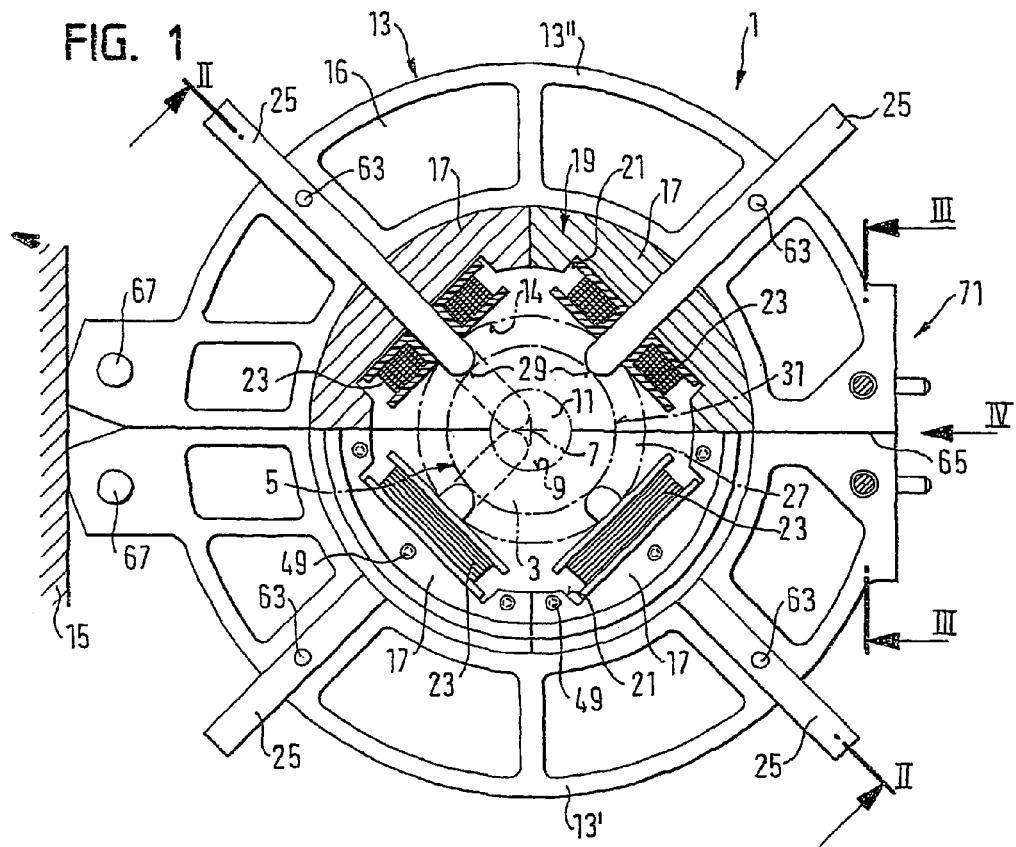
FIG. 1 shows an axial view of an induction coil unit according to the invention, seen along a line I-I in FIG. 2, half in the form of a section and half in the form of a plan view.
Figure 2:
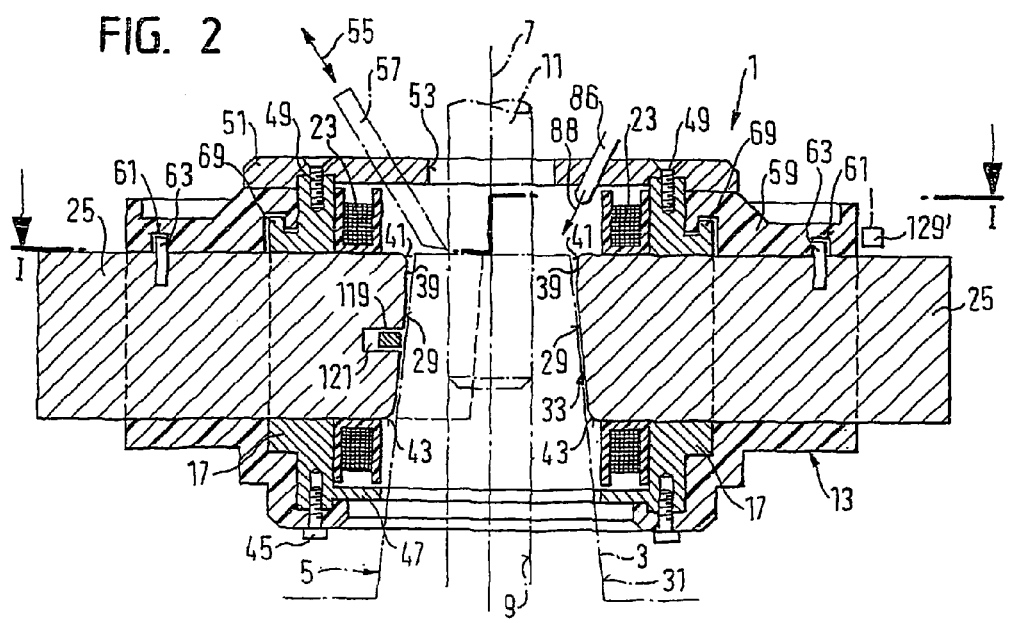
FIG. 2 shows an axial longitudinal section through the induction coil unit, seen along the line II-II in FIG. 1.

FIGS. 1 and 2 show an induction coil unit 1 with whose aid a sleeve part, which is indicated by a dashed-dotted line at 3 and is composed of electrically conductive material, in this case steel, of a tool holder 5 can be heated inductively. The tool holder 5, which is essentially rotationally symmetrical with respect to its operating rotation axis 7, has a retaining opening 9, which is central with respect to the operating rotation axis 7, for holding a shank 11, with an interference fit, of a rotating tool, for example a drill or a milling cutter which rotates about the rotation axis 7 during operation, but is not shown apart from this. The tool shank 11 is oversized with respect to the internal diameter of the cylindrical retaining opening 9 and is shrunk into the sleeve part 3. On heating, the sleeve part 3 widens, so that the tool shank 11 can be inserted into or removed from the retaining opening 9. After cooling down, the tool shank 11 which has been inserted into the retaining opening 9 is held in the sleeve part 3 with an interference fit. The tool holder 5 may be a component of a drive spindle of a machine tool, or may be provided on the side facing axially away from the sleeve part 3 with a conventional spindle clutch, such as a steep-cone clutch or a hollow-shaft clutch (HS clutch).

The induction coil unit 1 has an essentially annular housing 13, which is manufactured from electrical insulating material and is held, such that it can be moved axially during operation, in a manner that is not illustrated in any more detail on a guide 15 for a shrinking appliance. In the illustrated exemplary embodiment, the housing 13 is in the form of a stiff casting, which is provided with chambers 16 in order to reduce the weight and in which the components of the induction coil unit 1 are fitted. However, a potting compound ring can also be used as a load-bearing component for the housing in which, as indicated at 14, the components are permanently encapsulated, in particular such that they are essentially completely surrounded by the potting compound ring. If required, the housing 13 may in this case be used as a "lost mold".

The housing 13 surrounds a yoke ring 19, which is composed of segments 17 and is formed from a soft-magnetic material which is permeable to magnetic flux, for example ferrite, which is fitted with a coil 23, wound from high-frequency braid, in a pocket 21 on the inside of the ring of each yoke segment 17. With respect to their diameter, the coils 23 are flat and are arranged with a coil axis radially with respect to the rotation axis 11.

Each of the coils 23 surrounds a pole piece 25 composed of soft-magnetic material, for example ferrite, which is permeable to magnetic flux and is guided such that it can be moved radially with respect to the rotation axis 7 on the housing 13, the yoke ring 19 and, if appropriate, the coils 23. Each pole piece 25 in this case passes through the coils 23 and projects into a retaining area 27, which is bounded by the coils 23, for holding the sleeve part 3 of the tool holder 5. As is indicated by a dashed line in FIG. 1 for the pole pieces 25 illustrated on the left, the pole pieces 25 can be pushed radially to a point close to the rotation axis 7, so that sleeve parts 3 with widely differing diameters can be heated, as is shown in FIGS. 7 and 8.

The pole pieces 25 are in the form of flat plates whose flat faces each run parallel to the rotation axis 7. The pole pieces 25 have end surfaces 29 facing the rotation axis 7, by means of which they rest with a line contact or an area contact which is narrow in the circumferential direction on the outer circumferential surface 31 of the sleeve part 3. As is normal in the case of conventional tool holders, the circumferential surface 31 is conical, and the end surfaces 29 of the pole pieces 25 accordingly run in a first area 33 at an angle to the rotation axis 7, in the same sense, corresponding to the coning angle of the circumferential surface 31.

The pole pieces 25 are arranged at equal angular intervals rotationally symmetrically with respect to the rotation axis 7 and, together with the yoke ring 19, form magnetically permeable circuits which concentrate the magnetic flux produced by the coils 23 during operation on the sleeve part 3. The coils 23 are excited such that, as is shown in FIG. 9, the magnetic flux which is indicated by dashed-dotted lines 35 has an opposite flux direction in respectively adjacent pole pieces 25 in the circumferential direction. An even number of pole pieces 25 are accordingly provided. Four or more pole pieces are expediently provided. Since the pole pieces 25 rest in the form of a line or with only a relatively narrow area in the circumferential direction on the circumferential surface 31 of the sleeve part 3, the magnetic flux runs largely in the sleeve part 3 between adjacent pole pieces 25. The end surfaces 29 taper, as the section normal to the axis in FIG. 9 shows, towards the rotation axis 7, thus on the one hand reducing the contact area with which each pole piece 25 rests on the sleeve part 3, and on the other hand increasing the circumferential separation 37 between adjacent pole pieces 25, in order to reduce any stray fluxes. The end surfaces 29 may in this case be chamfered to be wedge-shaped, as is shown in FIG. 9, or else may be rounded in a spherical shape, in particular rounded in a semicircular shape, as shown in FIG. 1.

Since the circumferential surface 31 of the sleeve part 3 is conical, the circumferential length of the circumferential surface 31 decreases in the taper direction, that is to say towards the outlet side of the tool shank 11. However, as the circumferential length decreases, this also results in a decrease in the resistance facing the current which is induced in the sleeve part 3 by the magnetic alternating field and is used to heat the sleeve part 3. In order to nevertheless ensure heating that is as uniform as possible in the axial direction, a second area 39 is adjacent to the first area 33 of the end surface 29 towards the outlet side of the tool, in which second area 39 the end surface 29 runs at a radial distance from the generatrix of the circumferential surface 31 which is greater than the radial distance between the end surface 29 and the generatrix in the first area 33. In the illustrated exemplary embodiment, the end surface 29 in the area 39 runs parallel to the rotation axis 7; however, it may also be at an angle to the rotation axis 7 in the area 39, in particular running pointing away from the rotation axis 7 towards the tool outlet side. In this case, FIG. 7 shows the relationships for a sleeve part 3 with a large diameter, in which the pole pieces 25 with the second area 39 completely overlap the circumferential surface 31 in the axial direction. FIG. 8 shows the relationships for a sleeve part 3 with a smaller diameter, which is intended for clamping small workpiece shanks 11 and is accordingly in general also axially short. In order to additionally allow sleeve parts 3 with a diameter to be heated without replacing the pole pieces 25, the area 39 of the end surfaces 29 of the pole pieces 25 can project axially towards the tool outlet side without having to be concerned that the tool shank 11 will also be heated at the same time, which would make it harder to remove the tool. The area 39 of the end surfaces 29 ensures that the radial distance between the pole pieces 25 and the tool shank 11 is increased, and thus, because of the increased air gap, attenuation of any stray fields which may act on the tool shank 11.

It has been found that increased magnetic flux concentrations occur in the area of those ends of the end surfaces 29 which are axially remote from one another, and that the sleeve part 3 is accordingly heated to a greater extent, in an undesirable manner, in these areas than the rest of the sleeve part. In order to prevent this, those edges 41 and 43 of the end surfaces 29 which are axially at a distance from one another are rounded. The longer air gap to the sleeve part 3 which results from the rounding ensures more uniform heating even in the area of the axial edge areas of the pole pieces 25. The rounding of the edge 41 on the tool outlet side may be omitted, if required, since excessive heating is counteracted here just by the area 39 of the end surface 29.

As can be seen best in FIG. 2, the yoke segments 17 are attached to the housing 13, in this case by being screwed on at 45, and, on their side facing axially away from the tool outlet side, have an annular collar 47, which projects radially inwards, for magnetic shielding of the retaining area 27. On the axially opposite side, a shielding plate 51 which is essentially in the form of a annular disk is attached by screws 49, and shields the retaining area 27 on the tool outlet side.

During operation, the tool shank 11 passes through a central opening 53 in the shielding plate 51. An adjustable spacer 57, which can be adjusted with an axial component (arrow 55) in a manner which is not illustrated in any more detail on the housing 13, ensures, by contact with the axial end surface of the sleeve part 3, that the induction coil unit 1 is positioned in a predetermined reproducible manner relative to the sleeve part 3.

Figure 6:
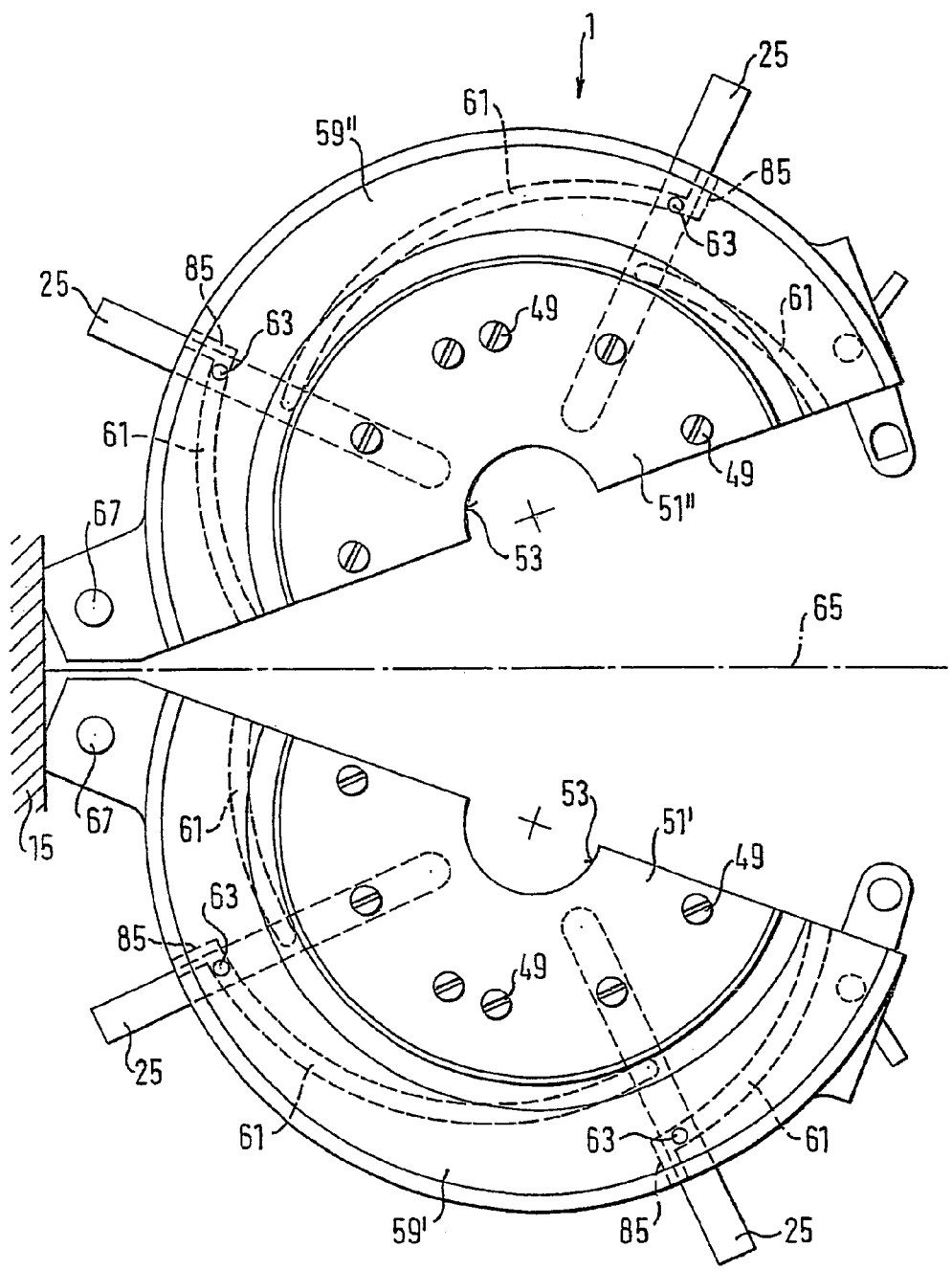
FIG. 6 shows an axial view of the induction coil unit in the radially open state.

In order to simplify handling, an annular actuating disk 59 is mounted on the housing 13 such that it can rotate coaxially with respect to the rotation axis 7. The actuating disk 59, as is shown in FIGS. 2 and 6, has spiral grooves 61, which cross the pole pieces, and in which pins 63 which project axially from the pole pieces 25 engage. The spiral grooves 61 form inclined-surface drives for the pole pieces 25, so that all of the pole pieces 25 are moved jointly towards or away from the rotation axis 7 by rotating the actuating disk 59. In this case, the pins 63 are seated in the spiral grooves 61 with radial play, so that, during operation, the magnetic field can draw the pole pieces 25 into touching contact with the sleeve part 3, with any tolerances being compensated for.

All of the components of the induction coil unit 1 which surround the rotation axis 7 in an annular shape are split into two halves along a diameter plane 65 which includes the rotation axis 7, are connected by means of a hinge 67 to a pivoting shaft which is parallel, to the rotation axis 7, and can be pivoted between an annular closed position, as illustrated in FIG. 1, and an open position, as illustrated in FIG. 6. The housing 13 is therefore split into two housing halves 13' and 13". The yoke segments 17 of the yoke ring 19 are arranged such that they abut against one another on the splitting plane 65. The actuating ring 59 has two actuating-ring halves 59' and 59", each of which halves is radially guided. in its own right, such that it can rotate coaxially with respect to the rotation axis 7, on an undercut annular shoulder 69 of the yoke segments 17 of the yoke ring 19, and is axially fixed between the housing 13 and the shielding ring 51. Finally, the shielding ring 51 is also formed from two annular halves 51' and 51".

Figure 4:
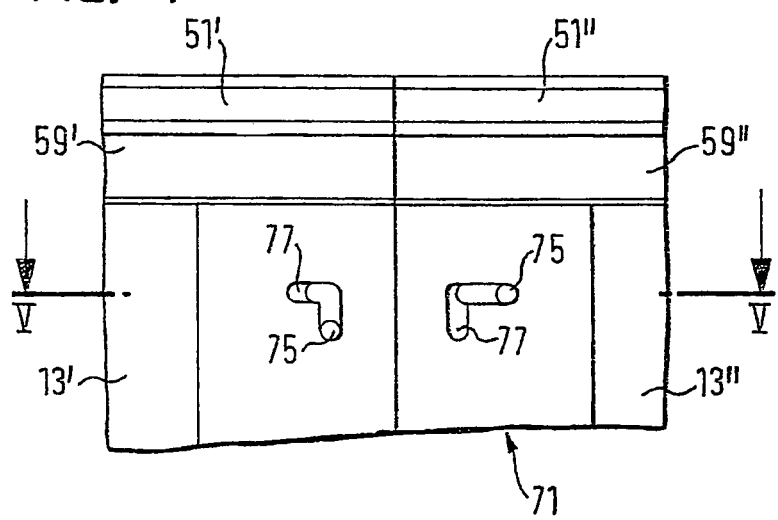
FIG. 4 shows a partial radial view of an induction coil unit, seen in the direction of the arrow IV in FIG. 1.
Figure 5:
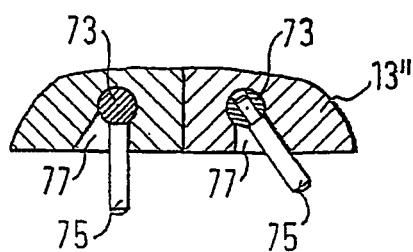
FIG. 5 shows a detailed view, seen along a line V-V in FIG. 4.

On the side diametrically opposite the hinge 67, the housing 13 is provided with a coupling apparatus 71 which couples the housing halves 13' and 13" to one another in the closed position, and locks the halves 59' and 59" of the actuating ring 59 in the open position relative to the housing halves 13', 13". As can best be seen in FIGS. 3 to 5, the coupling apparatus 71 has locking bolts 73, which are guided in the housing halves 13' and 13" parallel to the rotation axis 7, and whose handling pins 75 emerge through angled slots 77 to the outside from the housing halves 13' and 13". The locking bolts 73 can accordingly be moved manually between their axial limit positions, and are locked in the angled slots 77 by pivoting the handling pins 75. In their limit position remote from the actuating ring 59, the locking bolts 73 engage in openings 79 in locking plates 81, which are screwed to the respective other housing half and couple the housing halves 13' and 13" to one another in the closed position (FIG. 1).

Figure 3:
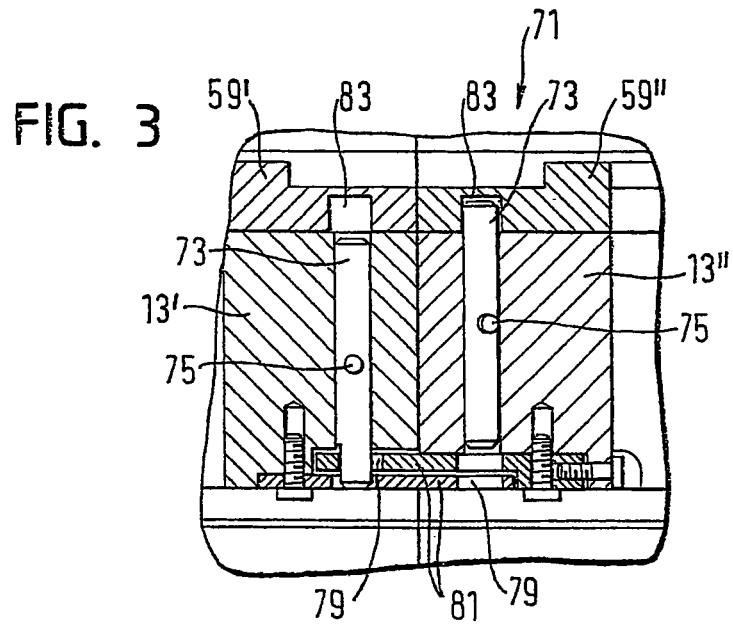
FIG. 3 shows a partial radial view of the induction coil unit, seen along the line III-III in FIG. 1.

When pushed to the axially opposite position, the locking bolts 79 release the locking plates 81, although they engage in openings 83 in the actuating-ring halves 59' and 59", and fix these actuating-ring halves to the respective housing halves 13' and 13". In order to explain this, FIG. 3 shows the locking bolt 73 of the housing half 13' in the position in which it is coupled to the housing 13, while the locking bolt 73 of the housing half 13" fixes the actuating-ring half 59" on the housing half 13" such that it cannot rotate.

Different types of tool holders may have sleeve parts with different coning angles. For the desired line contact with the pole pieces 25, it may therefore also be necessary to match the inclination angle of the end surface 29 in the area 33 to the coning angle of the circumferential surface 31. In the exemplary embodiment explained with reference to FIGS. 1 to 6, the set of pole pieces 25 may be removed from the housing 13 radially, and may be replaced by a different set of pole pieces with a different inclination of the end surface 29 In order to allow the pole pieces 25 to be replaced without destroying the induction coil unit 1, the spiral grooves 61 have at one of their ends, in this case their radially outer ends, an outlet 85 which is open to the circumference of the actuating ring 59 and releases the pins 63 when the pole pieces 25 are pulled out (FIG. 6). The outlet 85 extends radially or in the opposite sense to the spiral groove 61 adjacent to it, in order to prevent the pole pieces 25 from being released just by rotation of the actuating ring 59. It is self-evident that the outlet 85 may alternatively or additionally also be provided towards the inner circumference of the actuating ring 59, such that the pole pieces 25 can be removed radially inwards.

The adjustable spacer 57 ensures that the pole pieces 25, which can be moved radially, are aligned axially with respect to that area of the sleeve part 3 that is used to clamp the tool shank 11. The radial width of the free end of the sleeve part 3 normally likewise decreases as the diameter of the tool shank 11 decreases. Furthermore, the axial clamping length of the sleeve part 3 normally decreases as the diameter of the tool shank 11 decreases. In order to take account of this, the spacer 57 can expediently be moved at an angle to the rotation axis 7.

The pole pieces 25 can be moved radially together with the aid of the actuating ring 59. In order to also make it easier to adjust the spacer 57, it is expediently positively coupled via an adjusting transmission, for example a lever transmission or an inclined-surface transmission either with at least one of the pole pieces 25 or with the actuating ring 59 such that the spacer 57 is also suitably adjusted at the same time with the radial adjustment movement of the pole pieces 25.

Once the tool has been shrunk in or out, the tool holder 5 is normally moved to a separate station in which it is cooled down to ambient temperature. There is no need to move it to the cooling station if, as is shown in FIG. 2, at least one nozzle 86, which is directed at the sleeve part 3, and preferably a plurality of these nozzles arranged distributed in the circumferential direction are arranged in the area of the retaining area 27 and directs or direct a coolant jet 88, for example a cooling-water jet or cooling-air jet, at the sleeve part 3.

Variants of the induction coil unit or individual components of it will be explained in the following text. Where reference is made here and in the following text to components which have already been explained, the components are referred to using the same reference numbers, and are provided with a letter to distinguish them. Reference is made to the previous description, including the description of any variants. It should be noted that the features of the individual exemplary embodiments can be combined with one another.

Figure 10:
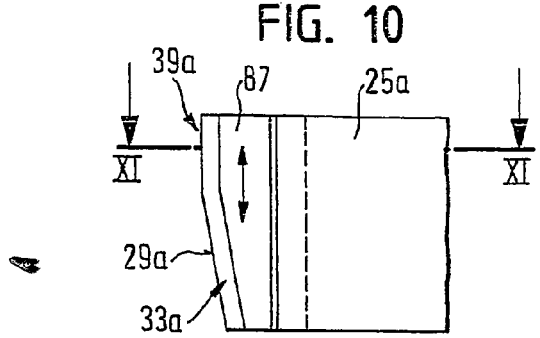
FIG. 10 shows a side view of a first variant of a pole piece which can be used for the induction coil unit in FIG. 1.
Figure 11:
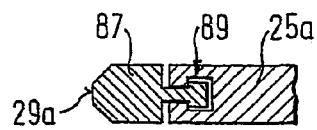
FIG. 11 shows a cross section through the pole piece, seen along the line XI-XI in FIG. 10.

In the embodiment of the induction coil unit that has already been explained, the pole pieces are all replaced for matching to different contours of the sleeve parts of the tool holder. FIGS. 10 and 11 show a pole piece 25a which is fitted at its end facing the rotation axis with an interchangeable end piece 87 which forms the end surface 29a with its areas 33a and 39a. The set of end pieces whose inclination angle is matched to the coning angle of the sleeve part of the tool holder can then be chosen from a plurality of sets of such end pieces 87, each with different inclination angles of the end surface 29a. in the illustrated exemplary embodiment, the end pieces 87 are connected to the pole piece 25a by means of a sliding guide, which runs longitudinally with respect to the rotation axis and is in the form of an undercut tongue-groove guide 89.

Figure 12:
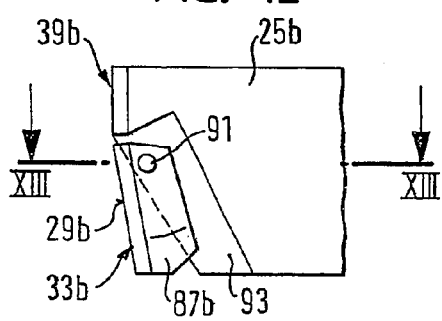
FIG. 12 shows a side view of a second variant of a pole piece which can be used for the induction coil unit shown in FIG. 1.
Figure 13:
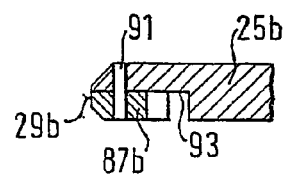
FIG. 13 shows a section view of the pole piece, seen along the line XIII-XIII in FIG. 12.

FIGS. 12 and 13 show a pole piece 25b in which the end piece 87b which forms the end surface 29b in the first area 33b is mounted on the pole piece 25b such that it can pivot, by means of a shaft 91 which runs tangentially with respect to the rotation axis. The end piece 87 is in this case seated in a pocket 93 which is formed by the pole piece 25b and guides the end piece 87. In a corresponding manner to the pole piece 25a, the pole piece 25b is also overall essentially in the form of a plate.

Figure 14:
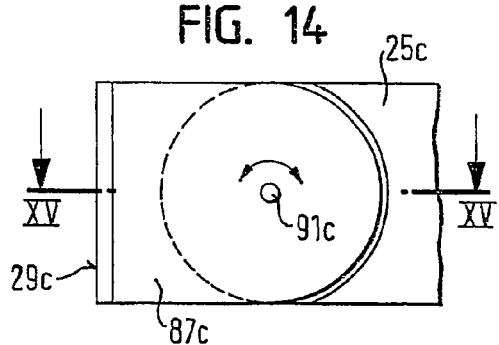
FIG. 14 shows a side view of a third variant of a pole piece which can be used for the induction coil unit shown in FIG. 1.
Figure 15:
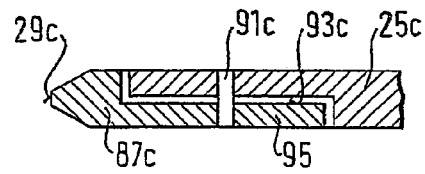
FIG. 15 shows a section view of the pole piece, seen along the line XV-XV in FIG. 14.

In contrast to the pole piece 25b, in which the second area 39b of the end surface 29b is firmly connected to the pole piece 25b, FIGS. 14 and 15 show a pole piece 25c whose end piece 87c which forms the end surface 29c extends over the entire axial height of the pole piece 25c and is once again connected to the pole piece 25c, such that it can pivot, on a shaft 91c which runs tangentially with respect to the rotation axis. The end piece 87c has an end section 95 which engages in a pocket 93c in the pole piece 25c.

Figure 16:
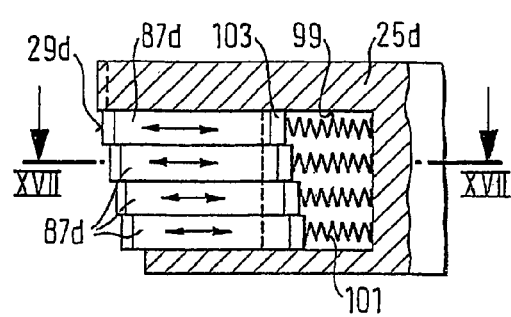
FIG. 16 shows a side view of a fourth variant of a pole piece which can be used for the induction coil unit shown in FIG. 1.
Figure 17:
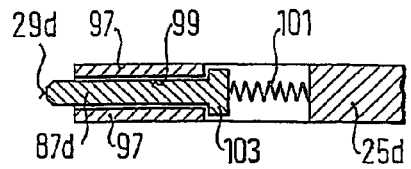
FIG. 17 shows a section view of the pole piece, seen along the line XVII-XVII in FIG. 16.

FIGS. 16 and 17 show a pole piece 25d with a chamber which is bounded by side walls 97 and is open towards the end surface 29d, and in which a stack of end pieces 87d are guided, such that they can be moved radially, such that they can be moved radially with respect to the rotation axis. The end pieces 87d form subareas of the end surface 29d and are prestressed towards the rotation axis by springs 101, so that they can automatically rest on the conical circumferential surface 31 of the sleeve part 3 of the tool holder 5. The end pieces 87d which face radially away from the end surface sections 29d are fitted with heads 103 which prevent the end pieces 87d from being pushed out of the chamber 99. The springs 101 are composed of a material which is not magnetically permeable and is preferably also not electrically conductive, for example a heat-resistant, elastic plastic material, or else may be completely omitted, since the end pieces 87d are drawn through the magnetic field to the sleeve part. The end surface sections 29d run parallel to the rotation axis, and ensure step-by-step approximation to the conical circumferential surface of the sleeve part.

FIGS. 18 and 19 show a pole piece 25e which differs from the pole piece 25d' in FIGS. 16 and 17 essentially only in the nature of the end pieces 87e which form the end surface sections 29e and are arranged in the form of a stack. The stack of end pieces 87e, which can move radially with respect to the rotation axis, is seated in a chamber 99e which is axially bounded by forked projections 105 with the end pieces 87e being guided such that they can be moved radially one another and relative to the forked projections 105 by means of guide ribs, which engage radially in guide grooves 107 of one part in each case, of the respective other part. The guide ribs 109 which engage in the guide grooves 107 guide the parts tangentially with respect to the rotation axis. The end pieces 87e are once again prestressed by springs 101e, which can once again be omitted here, if required.

FIGS. 20 and 21 show a further variant of a pole piece 25f with a multiplicity of cylindrical end pieces 87f, which are arranged alongside one another in the direction of the rotation axis, are guided such that they can be moved in radial holes 111 and, if required, are loaded towards the rotation axis by springs 101f. Those ends of the end pieces 87f which emerge from the holes 111 form the end surface 29f.

In the variant of the induction coil unit 1 explained with reference to FIGS. 1 to 6, the coils 23 are held on the yoke ring 19. FIG. 22 shows a variant of a pole piece 25g whose end surface 29g is designed in a corresponding manner to the embodiment shown in FIGS. 1 to 6. The coils 23g associated with the pole pieces 25g are, however, not provided on the yoke ring which is also present in this case and through which the pole pieces 25g pass, but form a unit, which can be moved radially, together with the pole piece 25g. In the illustrated exemplary embodiment, the winding of the coil 23g which surrounds the pole piece 25g is seated in cutouts 113. The winding of the coil 23g can end all the way round with the same contours as the pole piece 25g, or else may entirely or partially project beyond its circumferential contour.

In the variants of the induction coil unit which have already been explained, the pole pieces which can be brought into a linear touching contact with the sleeve part of the tool holder are in the form of pole pieces which can be moved radially with respect to a yoke ring. FIGS. 23 and 24 show a variant of an induction coil unit 1h whose pole pieces 25h are essentially in the form of flat wall panels of a yoke ring 19h which is in the form of a truncated pyramid and surrounds the retaining area 27h for the sleeve part 3h. With their inner wall surfaces 29h, the wall panels 25h form the end surface of the pole pieces, and their inner wall surfaces 29h make an at least approximately linear touching contact with the outer, conical circumferential surface of the sleeve part. The coils 23h which are associated with the wall panels 25h are arranged in the corner areas on the inside of the yoke ring 19h, which is in the form of a pyramid, where, if required, they engage in annular cutouts in the wall panels 25h. It is self-evident that the yoke ring 19h, which is in the form of a pyramid, can also if required be split on a diagonal surface which contains the rotation axis 7, as has been explained with reference to FIG. 6.

FIG. 25 shows a variant 1*i* of the induction coil unit from FIGS. 23 and 24, which differs from this unit essentially only in that the wall panels 25*i* which form the bole pieces can be moved tangentially and/or radially with respect to the rotation axis for matching to the diameter of the sleeve part 3*i*, as is indicated by arrows 115. The wall panels 25*i* may be inclined relative to the rotation axis 7*i*, corresponding to the arrows 117, in order to snatch the inclination angle of the wall panels 25*i* to the coning angle of the sleeve part 3*i*.

In the embodiments of the induction coil unit which have already been explained, the pole pieces make touching contact with the circumferential surface, or are closely adjacent to it, during operation, on the outer circumferential surface of the sleeve part of the tool holder. As is shown in FIG. 2, this situation can be made use of to arrange a temperature sensor 119 in that end surface 29 of the pole piece 25 which is intended to make the touching contact, for example in a cutout 121 in the pole piece 25, with this cutout 121 being open towards the end surface 29. The temperature sensor 119 can then make direct touching contact with the circumferential surface 31 of the sleeve part during operation, if necessary prestressed by a spring or springs, thus allowing very accurate temperature measurement of the surface of the sleeve part 3.

FIG. 26 shows, schematically, an electrical block diagram of the induction coil unit, in which the induction coils 23 are all connected in parallel with one another, and are connected to an alternating-current generator 123. The alternating-current generator 123 responds to the temperature sensor 119 and switches off the coil current to the coils 23 as soon as the circumferential surface 31 of the sleeve part 3 has reached a predetermined temperature, which sufficient for the widening process. It is self-evident that, if required, a plurality of such temperature sensors may be provided distributed in the axial direction and/or in the circumferential direction. For symmetry reasons, the coils are all wound in the same sense with respect to the radial direction, with the polarity of their connections ensuring that the magnetic flux direction alternates in the circumferential direction, as has been explained with reference to FIG. 9.

As an alternative or in addition to the temperature-dependent switching-off function of the alternating-current generator 123 as explained above, a warning device 125 can be provided, which responds to the temperature sensor 119 and emits a visual and/or audible warning signal, in order to end the heating mode manually, when the predetermined temperature is reached or exceeded. As an alternative or else in addition to this, it is also possible to provide an indication device 127, which is connected to the temperature sensor 119 and numerically indicates the instantaneous detected temperature value on a display, for example.

The power and/or the output current level and/or the duration of coil excitation are normally preset for the alternating-current generator 123 as a function of the tool holder to be heated, since the amount of energy required to heat a tool holder with a small diameter is less than that for a tool holder with a large diameter. In order to allow the alternating-current generator 123 to be controlled automatically, it responds to a position sensor 129 which detects the radial position of at least one of the pole pieces 25. The radial position of the pole piece 25 is a measure of the amount of energy required for heating the tool holder. It is self-evident that the position sensor 129 can also detect the rotation position of the actuating ring 59, as is indicated at 129' in FIG. 2. In particular, in the last-mentioned variant, the position sensor 129' can detect the position on the external circumference of the actuating ring 59 with respect to a relatively large actuating movement.

It is self-evident that the circuit arrangement shown in FIG. 26 can also be used for the other embodiments of the induction coil unit that have been explained above.

The invention claimed is:

1. An induction coil unit for heating a component which is rotationally symmetrical relative to an axis and is composed of electrically conductive material, which holds an elongated object with an interference fit in a retaining opening which is central with respect to the axis, comprising:
    a retaining area which is central with respect to the axis for the component;
    a number of pole pieces which are arranged distributed at equal angular intervals around the axis and are composed of a material with soft-magnetic characteristics, guiding magnetic flux; and
    a plurality of coils which can be fed with alternating current, to produce magnetic fluxes in the pole pieces such that the magnetic flux is in the opposite direction in the circumferential direction of adjacent pole pieces, wherein the pole pieces have end surfaces which radially face the axis and can be brought substantially into touching contact, in the form of a line or an area, with the outer circumferential surface of the component over the majority of their axial height in a first area along the generatrix of an outer circumferential surface of the component, and in that a second area is adjacent to the first area axially on at least one side of the first area, at least one of the end surfaces, in which second area the end surface runs at a greater radial distance from the generatrix of the outer circumferential surface than in the first area.

2. The induction coil unit as claimed in claim 1, wherein the end surface runs at an angle to the generatrix of the circumferential surface in the second area with the radial distance from the generatrix increasing as an axial distance from the first area increases.

3. The induction coil unit as claimed in claim 2, wherein the generatrix defines a conical circumferential surface of the component and the end surfaces in the first area are inclined in the same sense with respect to the axis, and in that the second area is adjacent to the end surfaces on the side of the first area with the smaller diameter.

4. The induction coil unit as claimed claim 1, wherein the component is in the form of a sleeve part of a tool holder, which holds the shank of a rotating tool in the retaining opening centrally with respect to the rotation axis and with an interference fit, and the second area is provided on that side of the first area which is adjacent to the tool outlet side of the sleeve part.

5. The induction coil unit as claimed in claim 1, wherein the end surface of each pole piece which radially faces the axis has at one of its axial ends, or at both of its axial ends, an edge surface section which is rounded and runs away from the axis.

6. The induction coil unit as claimed in claim 5, wherein the component is in the form of a sleeve part of a tool holder, which holds the shank of a rotating tool in the retaining opening centrally with respect to the rotation axis and with an interference fit, and the edge surface section which runs away from the rotation axis is provided at least at that end of the end surface which is axially remote from the tool outlet side.

7. The induction coil unit as claimed in claim 1, wherein the pole pieces are in the form of flat disks, whose flat faces run essentially parallel to the axis, and whose end surfaces which radially face the axis can be brought substantially into touching contact, in the form of a line or an area, with the outer circumferential surface of the component over the majority of their axial height.

8. The induction coil as claimed in claim 1, wherein each pole piece unit as claimed in one of that that end surface of which faces the axis tapers towards the axis, at least in its touching contact area.

9. The induction coil unit as claimed in claim 8, wherein the end surface is rounded in a convex shape in the touching contact area.

10. The induction coil unit as claimed in claim 8, wherein the end surface is tapered in a wedge shape in the touching contact area.

11. The induction coil unit as claimed in one of claim 1, wherein the pole pieces can be moved radially relative to a yoke ring, which surrounds the retaining area concentrically with respect to the axis and is composed of soft-magnetic material which is permeable to magnetic flux, and the coils are arranged radially within the yoke ring.

12. The induction coil unit as claimed in claim 11, wherein each pole piece has a separate associated coil which surrounds its pole piece.

13. The induction coil unit as claimed in claim 12, wherein the yoke ring is composed of segments.

14. The induction coil unit as claimed in claim 11, wherein the pole pieces pass through openings in the yoke ring, such that they can move.

15. The induction coil unit as claimed in claim 11, wherein the yoke ring covers those axial end surfaces of the coils which face it on all sides.

16. The induction coil unit as claimed in claim 11, wherein each coil engages in a pocket, which is radially recessed in the yoke ring, at least over a part of its axial coil height.

17. The induction coil unit as claimed in claim 11, wherein each coil is combined with the pole piece which surrounds it to form a unit which can be moved radially.

18. The induction coil unit as claimed in claim 11, wherein the yoke ring and the coils are fixed in an annular housing composed of electrically insulating material.

19. The induction coil unit as claimed in claim 18, wherein the housing has a ring, which is cast on the yoke ring and the coils, surrounds at least the coils, and is composed of plastic potting compound.

20. The induction coil unit as claimed in claim 11, wherein the yoke ring is fitted on at least one of its end faces with an annular disk which is provided with a central aperture opening for the component and is composed of soft-magnetic material, which is permeable to magnetic flux, at an axial distance from the pole pieces.

21. The induction coil unit as claimed in claim 1, wherein the pole pieces are guided such that they can move radially relative to a housing which surrounds the retaining area in an annular shape, and are coupled to an actuating ring, which is guided coaxially with respect to the axis such that it can rotate on an annular guide, which surrounds the retaining area, of the housing, such that, when the actuating ring carries out a rotary movement, the pole pieces jointly carry out a radial displacement movement.

22. The induction coil unit as claimed in claim 21, wherein the housing is subdivided into two assemblies, which can be moved relative to one another, radially with respect to the axis, for radial opening of the retaining area, and in that a coupling apparatus detachably connects the assemblies to one another.

23. The induction coil unit as claimed in claim 1, wherein the pole pieces are guided such that they can move radially relative to a housing which surrounds the retaining area in an annular shape, and are coupled to an actuating ring, which is guided coaxially with respect to the axis such that it can rotate on an annular guide, which surrounds the retaining area, of the housing, such that, when the actuating ring carries out a rotary movement, the pole pieces jointly carry out a radial displacement movement, in that the housing including the actuating ring which is guided such that it can rotate coaxially on it is subdivided into two assemblies, which can be moved relative to one another, radially with respect to the axis, for radial opening of the retaining area, and in that a coupling apparatus detachably connects the assemblies during operation.

24. The induction coil unit as claimed in claim 23, wherein the housing has two housing segments, which are connected to one another by means of a hinge such that they can be folded radially with respect to the axis, each of which housing segments is fitted with a segment of the actuating ring, which is subdivided into two actuating ring segments, such that it is radially fixed but can rotate on its own, and in that the coupling apparatus connects the housing segments to one another in a first position and allows the actuating-ring segments to rotate and, in a second position, releases the housing segments for opening of the retaining area and fixes the actuating-ring segments on the housing segments such that they cannot rotate.

25. The induction coil unit as claimed in claim 24, wherein the coupling apparatus has in each case one bolt piece, which can move between the two positions, on each of the housing segments.

26. The induction coil unit as claimed in claim 25, wherein the bolt pieces are in the form of push bolts which can be moved between the two positions parallel to the axis on the housing segments.

27. The induction coil unit as claimed in claim 23, wherein the actuating ring has spiral guides which interact with coupling members of the pole pieces and convert the rotary movement of the actuating ring to a joint radial pushing movement of the pole pieces.

28. The induction coil unit as claimed in claim 27, wherein the spiral guides open on the circumference of the actuating ring and the pole pieces are guided in the housing such that they can be removed radially.

29. The induction coil unit as claimed in claim 1, wherein the pole pieces have end surfaces which radially face the axis over at least the majority of their axial height and can be brought substantially into touching contact, in the form of a line or an area, with the outer circumferential surface of the component, with the contour of the end surface being variable during operation.

30. The induction coil unit as claimed in claim 29, wherein the end surface is provided on an end piece which is held on the pole piece such that it can pivot about a pivoting axis which runs tangentially with respect to the rotation axis.

31. The induction coil unit as claimed in claim 29, wherein the end surface is provided on an end piece which is held on the pole piece such that it can be replaced for operational purposes.

32. The induction coil unit as claimed in claim 29, wherein the pole piece has a plurality of end pieces which can be moved relative to one another radially with respect to the axis and whose end surfaces which radially face the axis jointly form the end surface of the pole piece.

33. The induction coil unit as claimed in claim 32, wherein the end pieces are guided, such that they can move radially, on at least one of the pole piece or one another.

34. The induction coil unit as claimed in claim 33, wherein the end pieces are combined to form a stack which is guided, such that it can move radially, on the pole piece, and the end pieces are guided such that they can move radially on one another in the stack.

35. The induction coil unit as claimed in claim 33, wherein the end pieces are essentially cylindrical and are guided, such that they can move radially, in radial openings.

36. The induction coil unit as claimed in claim 29, wherein an actuating ring is mounted coaxially with respect to the axis on the housing, in that the actuating ring has spiral guides which interact with coupling members of the pole pieces and convert rotary movement of the actuating ring to a joint radial actuating movement of the pole pieces, and in that the spiral guides open on the circumference of the actuating ring and the pole pieces are guided in the housing such that they can be removed radially.

37. The induction coil unit as claimed in claim 1, wherein the pole pieces essentially form flat wall surfaces of a yoke ring which is in the form of a truncated pyramid and surrounds the retaining area, in which case the inner wall surfaces, which form the end surfaces of the pole pieces, of the wall panels can be brought substantially into touching contact, at least approximately in the form of a line, with the outer, conical circumferential surface of the component.

38. The induction coil unit as claimed in claim 37, wherein the wall panels are guided such that they can be moved at least one of tangentially or radially with respect to the axis for at least one of matching to the diameter of the component or being guided such that they can be inclined relative to the axis for matching to the coning angle of the component.

39. The induction coil unit as claimed in claim 1, wherein at least one temperature sensor which can be brought into direct touching contact with the circumferential surface, is arranged in the end surface, which can be brought substantially into touching contact with the outer circumferential surface of the component, or close to this end surface of at least one of the pole pieces.

40. The induction coil unit as claimed in claim 39, wherein the coils are connected to a generator which supplies alternating current, and in that the generator responds to the temperature sensor and switches off the alternating current when the temperature sensor detects a temperature equal to or greater than a predetermined temperature.

41. The induction coil unit as claimed in claim 39, wherein a signaling arrangement is provided which responds to the temperature sensor and produces at least one of a visual or audible signal when the temperature sensor detects a temperature which is equal to or greater than a predetermined temperature.

42. The induction coil unit as claimed in claim 39, wherein an indication arrangement is provided, which responds to the temperature sensor and indicates the value of the temperature sensor detected by the temperature.

43. The induction coil unit as claimed in claim 1, wherein the component is in the form of a sleeve part, which holds the shank of a rotating tool in the retaining opening centrally with respect to the rotation axis with an interference fit, for a tool holder, in that the pole pieces are guided such that they can be moved on a housing which surrounds the retaining area in an annular shape, and in that a spacer which can be adjusted such that it can move in at least one of the axial or radial direction is guided on the housing.

44. The induction coil unit as claimed in claim 43, wherein the pole pieces and the spacer are positively coupled to one another, for joint movement.

45. The induction coil unit as claimed in claim 1, wherein the pole pieces are guided such that they can move on a housing which surrounds the retaining area in an annular shape, and/or a stop element which can move in the axial and/or radial direction is guided on the housing and is intended to make contact with the component to be heated during operation, in that at least one of the pole pieces and/or the stop element and/or a structural part which is positively coupled to at least one of these components has an associated position sensor which detects the position of the pole piece and/or of the stop element and/or of the structural part relative to the housing, and in that the coils are connected to a generator which supplies alternating current and responds to the position sensor, whose power and/or current level of the alternating current that is supplied and/or time period for which current is supplied can be controlled as a function of the detected position.

46. The induction coil unit as claimed in claim 1, wherein all of the coils are connected in parallel with one another.

47. The induction coil unit as claimed in claim 1, wherein all of the coils are wound in the same sense with respect to the radial direction, and have the same number of turns.

48. The induction coil unit as claimed in claim 1, wherein at least four pole pieces are provided distributed in the circumferential direction, each of which has an associated separate coil.

49. The induction coil unit as claimed in claim 1, wherein at least one nozzle which is directed at the component for supplying coolant is provided in the area of the retaining area.

* * * * *